B. P. Van Marter.

Distilling Essential Oils.

No. 3,612. Reissued Aug. 17, 1869.

Witnesses:

Geo. H. Read
J. B. Clarke

Inventor:

Barton P. Van Marter
by Prindle & Co. Atty's

N. PETERS, PHOTO-LITHOGRAPHER, WASHINGTON, D. C.

UNITED STATES PATENT OFFICE.

BARTON P. VAN MARTER, OF LYONS, NEW YORK.

IMPROVEMENT IN TUBS FOR DISTILLING ESSENTIAL OILS.

Specification forming part of Letters Patent No. 86,115, dated January 19, 1869; Reissue No. 3,612, dated August 17, 1869.

*To all whom it may concern:*

Be it known that I, BARTON P. VAN MARTER, of Lyons, in the county of Wayne and State of New York, have invented certain new and useful Improvements in Distilling-Tubs; and do hereby declare that the following is a full, clear, and exact description of the same, reference being had to the accompanying drawing, making a part of this specification, in which—

Figure 1:
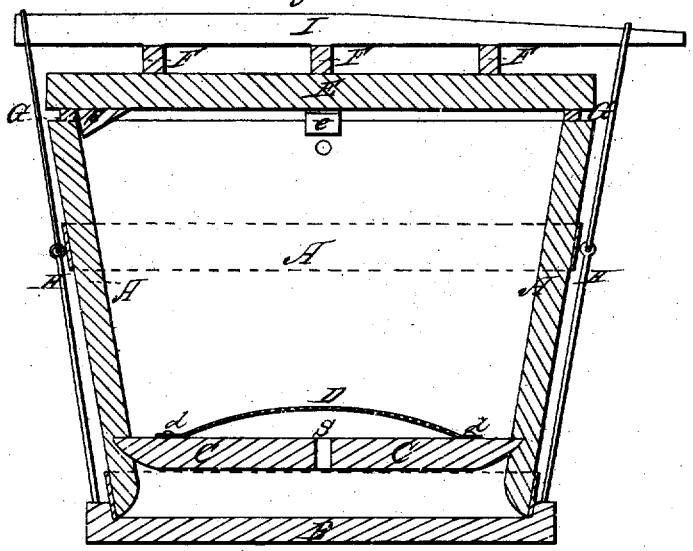
Figure 2:
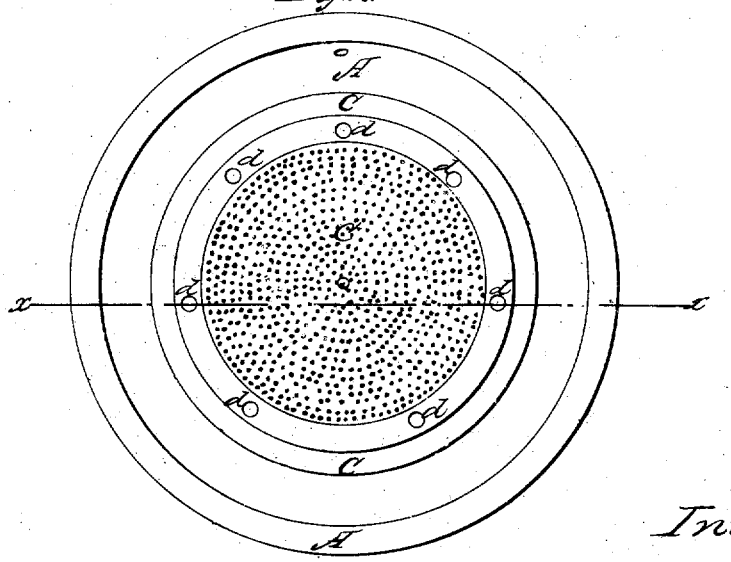

Figure 1 is a vertical central section of Fig. 2 upon the line *x x*. Fig. 2 is a top view with the cover removed.

Letters of like name and kind refer to like parts in each of the figures.

In tubs heretofore used for distilling essential oils, a false bottom, some four inches less in diameter than the inside of the tub, was placed about four inches above the real bottom, and steam admitted through the side of said tub between said bottoms. This method of introducing the steam was, however, open to serious objections, as it was not evenly and thoroughly distributed through the plants, whereby more time was consumed in extracting the oils than would otherwise be required.

Another serious objection arose from the difficulty experienced in filling and emptying the tubs. The top of each tub was closed by a head similar to those in barrels, having in its center a hole some two feet in diameter, through which the operator was obliged to pack and discharge the mint. This was a tedious and difficult operation, it being necessary that a man should get into the tub and arrange the mint as passed through the opening, and after distillation the straw was slowly removed by means of a hook.

To render the opening steam-tight, a tapering plug was fitted thereto, and, after having been coated with a paste made of wheat-flour, secured in place by means of a stick of timber, one end of which rested upon said plug, while the other end was crowded beneath the beams above.

To obviate these objections is the object of my invention, which consists, first, in introducing the steam through an opening in the bottom of the tub, and disseminating it through the mint by means of a convex perforated plate of sheet-metal placed directly over said opening; second, in so constructing the tub as that the entire cover may be readily removed from or adjusted thereto at the will of the operator, and in connection therewith the means provided for securing said cover in place when closed; third, in the employment of a rubber ring between the cover and the upper ends of the staves, by means of which, when pressure is applied to said cover, a steam-tight joint is produced.

In the annexed drawing, A represents the tub, of the usual form and construction, mounted upon and secured to a beam, B. At the bottom, C, of the tub is an aperture, *c*, for for the admission of steam, placed directly over which and secured to said bottom is a perforated plate of sheet metal, D, made convex upon its upper side, the object of which is to prevent the mint from pressing down upon and closing the opening *c*, and also to more thoroughly distribute the steam through the mass of plants; or the steam may be introduced beneath the plate by means of a pipe in any convenient manner.

E represents the cover, strengthened by three cross-bars, F F F, upon its upper side, and provided with three or more stops or guides, *e e*, so arranged upon its under side as to just shut into the tub and hold the cover in place. G represents a ring of rubber, placed between the cover and the upper ends of the staves, for the purpose of making a tight joint. For convenience said rubber is secured within a groove in the under side of the cover; but it will be readily seen that its operation will be the same whether secured to said cover or to the upper ends of the staves, or even if placed loosely between said cover and staves.

In order to secure the cover firmly in place, and at the same time to permit of its ready removal when desired, the following-described devices are used: Two rods, H H, having upon the upper end of each a link, are fastened within the beam, B, and extend upward upon opposite sides of the tub to the top of the cover. One end of a strong bar, I, is passed through one of the links, when, by pressing down upon the opposite end, the cover is forced down upon the tub until a perfect bearing is secured for the rubber. The lever is fastened in place by passing the opposite link over its free end.

Among the advantages possessed by this device over any in use intended for a like purpose, are—

First, a great saving in time and a consequent increase in the capacity of the distilling apparatus, as by means of the removable cover the whole top of the tub can be opened and one man perform the operations of filling and discharging in one-fourth the time formerly required, and for which two men were necessary. Also, by the use of the rubber ring for securing a steam-tight joint, in connection with the devices for pressing down and fastening the cover, there is effected a saving of at least one-half hour each time that the operation is performed.

Second, by means of the perforated plate, the steam is more throughly and evenly disseminated through the mint, and a better result produced in less time, and consequently at less expense.

Having thus fully set forth the nature and merits of my invention, what I claim as new, and desire to secure by Letters Patent, is—

1. The employment of the convex-shaped perforated metal plate D, when arranged to operate substantially as and for the purpose herein described.

2. The cover E, when provided with the rubber ring G, substantially as described, and for the purpose set forth.

3. The employment of a rubber ring between the cover and the upper end of the staves, for the purpose herein specified.

4. The devices used for pressing down and securing the cover E in place, consisting of the beam B, rods H H, and bar I, constructed and arranged substantially as herein specified.

5. The still consisting of the tub A, beam B, bottom C, disk D, cover E, rubber ring G, rods H H, and bar I, all constructed and arranged substantially as and for the purpose specified.

In testimony that I claim the foregoing I have hereunto set my hand this 29th day of July, 1869.

B. P. VAN MARTER.

Witnesses:
WM. VAN MARTER,
WM. H. VAN MARTER.